(12) United States Patent
Parrish et al.

(10) Patent No.: US 6,508,003 B1
(45) Date of Patent: *Jan. 21, 2003

(54) UNIVERSAL SAW ADAPTER

(75) Inventors: Bradford J. Parrish, Oregon City, OR (US); Edgar A. Dallas, Beaverton, OR (US)

(73) Assignee: Alterra Holdings Corporation, Tigard, OR (US)

( * ) Notice: Subject to any disclaimer, the term of this patent is extended or adjusted under 35 U.S.C. 154(b) by 10 days.

This patent is subject to a terminal disclaimer.

(21) Appl. No.: 09/591,760

(22) Filed: Jun. 12, 2000

Related U.S. Application Data

(63) Continuation of application No. 09/012,252, filed on Jan. 23, 1998, now Pat. No. 6,105,260.

(51) Int. Cl.⁷ .................................................. B26B 1/02
(52) U.S. Cl. ............................. 30/157; 30/331; 30/339; 83/699.21
(58) Field of Search .................... 83/699.21; 30/331, 30/339, 330, 332, 333, 334, 337, 156, 157

(56) References Cited

U.S. PATENT DOCUMENTS

| | | | |
|---|---|---|---|
| 196,354 A | | 10/1877 | Harris |
| 472,104 A | | 4/1892 | Von Bultzingslowen |
| 905,132 A | | 12/1908 | Bacon |
| 1,064,545 A | * | 6/1913 | Rote |
| 1,436,740 A | * | 11/1922 | Wesson |
| 1,477,721 A | * | 12/1923 | Shee |
| 1,563,674 A | | 12/1925 | Stuart |
| 1,780,549 A | * | 11/1930 | Ashworth |
| 1,796,870 A | * | 3/1931 | Huhn et al. |
| 1,915,244 A | | 6/1933 | Beaver |
| 1,940,855 A | | 12/1933 | Friedman |
| 2,137,800 A | | 11/1938 | Davey |
| 2,149,241 A | | 2/1939 | Davey |
| 2,282,902 A | | 5/1942 | Sultan |
| 2,487,624 A | * | 11/1949 | Wiggers |
| 2,697,270 A | * | 12/1954 | Glotzer |
| 2,954,808 A | | 10/1960 | Sweeney et al. |
| 3,754,330 A | | 8/1973 | Anderson et al. |
| 3,906,625 A | * | 9/1975 | Gringer |
| 3,996,665 A | * | 12/1976 | Malchow |
| 4,005,525 A | * | 2/1977 | Gringer |
| 4,083,112 A | | 4/1978 | Palm |
| 4,106,181 A | | 8/1978 | Mattchen |
| 4,294,013 A | | 10/1981 | Kreig |
| 4,451,982 A | | 6/1984 | Collins |
| 4,660,284 A | | 4/1987 | Decarolis |
| 5,475,925 A | | 12/1995 | Newman et al. |
| 5,735,866 A | | 4/1998 | Adams et al. |
| 5,769,094 A | * | 6/1998 | Jenkins |
| 6,105,260 A | * | 8/2000 | Parrish et al. |

OTHER PUBLICATIONS

Search Report issued by the European Patent Office dated Aug. 9, 2001.

* cited by examiner

*Primary Examiner*—Kenneth E. Peterson
(74) *Attorney, Agent, or Firm*—Foley & Lardner

(57) ABSTRACT

An adapter is provided for removably coupling a saw, including a tang portion having an aperture formed therein, to a tool. The adapter includes a base member and a clip pivotally coupled to the base member. The base member has first and second ends, and first and second surfaces extending between therebetween. An opening is formed in the first and second surfaces of the base member, proximate the first end. The opening is adapted to receive an axle of the tool. The base member further includes a slot formed in the first surface and a projection extending in to the slot. The slot is adapted to receive the tang portion of the saw, and a projection is adapted to be received in the aperture to align the saw with the base member. The pivotally coupled clip is movable between a closed position, in which the saw is retained in and secured to the base member, and an open position, in which the saw is removable from the base member.

12 Claims, 4 Drawing Sheets

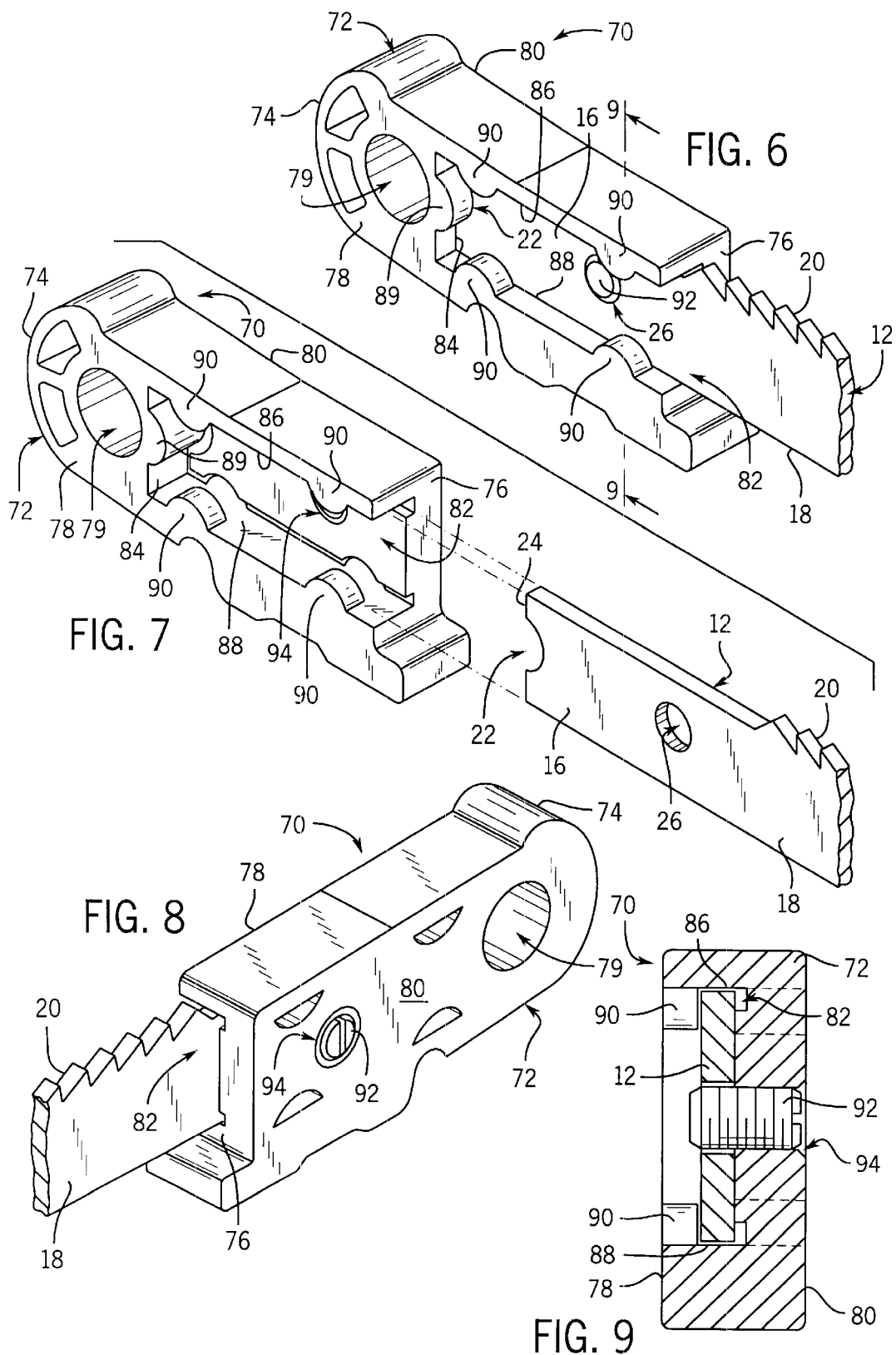

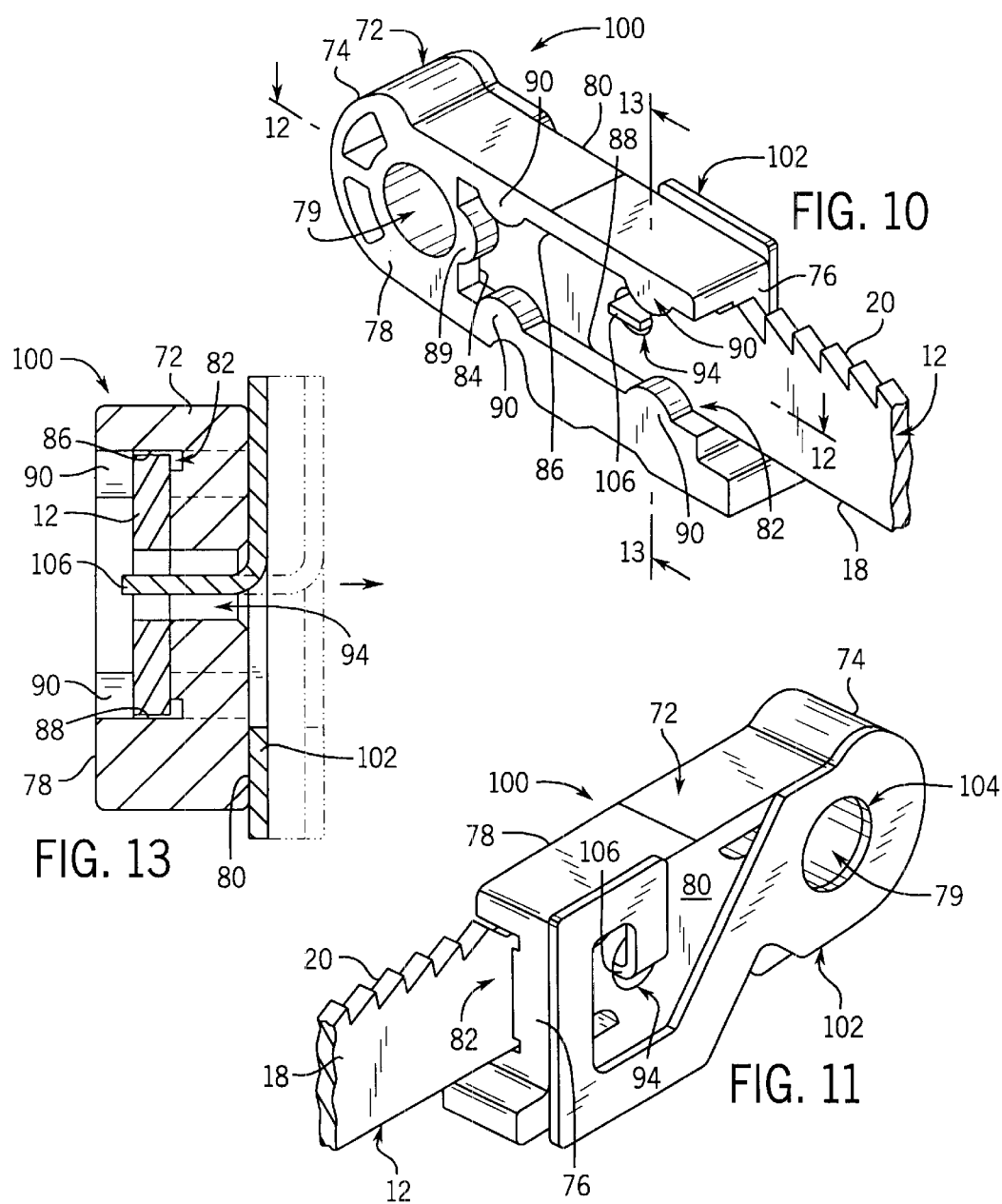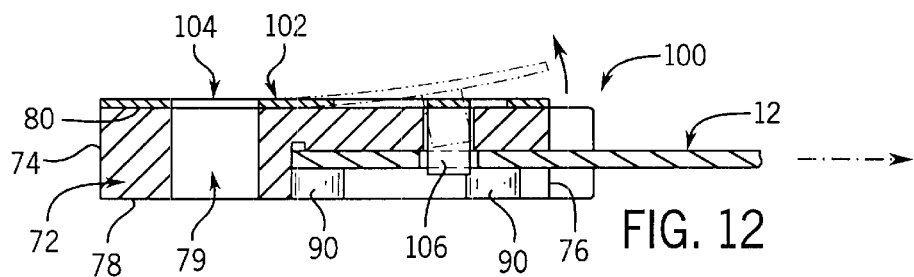

UNIVERSAL SAW ADAPTER

This is a continuation of application Ser. No. 09/012,252, filed Jan. 23, 1998, U.S. Pat. No. 6,105,260.

FIELD OF THE INVENTION

This invention relates to a pocket tool having an implement, such as a saw. More particularly, the present invention relates to an adapter for removably coupling a saw to the pocket tool.

BACKGROUND OF THE INVENTION

Multi-function tools, such as pocket tools including in a single instrument, pliers, and other selected tools, such as screwdrivers, knife blades, saw blades, files and the like, are well known. These multi-function tools are versatile as they provide multiple implements suitable for a variety of applications.

Most multi-function tools, however, typically include only one type of saw which is permanently attached to the tool. In certain circumstances it may be desirable to interchange one type of saw with another. It would also be advantageous to be able to replace a worn or damaged saw, as opposed to replacing the entire multi-function tool.

Several prior art tools provide saws that are removably coupled thereto. For example, in U.S. Pat. No. 4,660,284, issued on Apr. 28, 1987 to Joseph P. Decarolis, a folding pocket saw includes a mounting subassembly for releasably attaching the saw blade to the tool. The mounting subassembly includes three separate pieces; a head; a clamping plate; and a screw. One disadvantage with this mounting subassembly is that, since the parts are separate, one or more pieces of the subassembly could easily be lost or misplaced.

In light of the foregoing, there is a need for an effective adapter for removably coupling a saw to a tool, such as multi-function tool. In addition, it is desirable to provide an adapter with very few or no loose parts. Finally, it is further desirable to provide an adapter with a locking mechanism that is not prone to being accidentally released.

SUMMARY OF THE PRESENT INVENTION

In accordance with one aspect of the present invention, an adapter for removably coupling a saw to a tool includes a base member and a clip. The base member has first and second ends, and first and second surfaces extending therebetween. An opening is formed in the first and second surfaces of the base member, proximate the first end. The opening is adapted to receive an axle of the tool. The base member further includes a slot, which is formed in the first surface and is adapted to receive a tang portion of the saw. A projection extends into the slot and is adapted to be received in an aperture in the tang portion of the saw, to align the saw with the base member. The clip is pivotally coupled to the base member and is movable between an open position and a closed position. In the open position the saw is removable from the base member. In the closed position the saw is retained in and secured to the base member.

In accordance with another aspect of the invention, an adapter is provided for removably coupling a saw, including a tang portion having a notch and an aperture formed therein, to a tool. The adapter includes a base member and a clip. The base member has first and second ends, and first and second surfaces extending between the first and second ends. An opening, which is formed in the first and second surfaces of the base member proximate the first end, is adapted to receive an axle of the tool. A slot, formed in the first surface, extends from proximate the opening to the second end and is adapted to receive the tang portion of the saw. The base member further includes first and second projections, both of which extend into the slot. The first projection is configured to engage the notch of the saw, and the second projection is adapted to be received in the aperture. The clip, which is pivotally coupled to the base member, is movable between an open position, in which the saw is removable from the base member, and a closed position, in which the saw is retained in and secured to the base member. The clip further includes a means for locking the clip in the closed position.

In accordance with still another aspect of the invention, an adapter is provided for removably coupling a saw, including a tang portion having an aperture formed therein, to a tool. The adapter includes a base member and a projection. The base member has first and second ends, and first and second surfaces extending between the first and second ends. A first opening is formed in the first and second surfaces of the base member, proximate the first end. The first opening is adapted to receive an axle of the tool. The base member further includes a slot, which is formed in the first surface and adapted to receive the tang portion of the saw, and a plurality of undercut bosses. The undercut bosses, which are located on the first surface and extend into the slot, are adapted to retain the saw in the base member. A second opening is formed in the second surface of the base member and extends to the slot. The second opening coincides with the aperture of the saw and receives the projection to secure the saw to the base member.

Other principal features and advantages of the invention will become apparent to those skilled in the art upon review of the following drawings, the detailed description and the appended claims.

BRIEF DESCRIPTION OF THE DRAWINGS

The present invention will become more fully understood from the following detailed description, taken in conjunction with the accompanying drawings, wherein like reference numerals denote like elements, in which:

FIG. 6 is a front, perspective view of a universal saw adapter, in accordance with a second embodiment of the invention, with a saw attached;

FIG. 7 is a perspective view of the universal saw adapter of FIG. 6 with the saw removed;

FIG. 8 is a rear, perspective view of the universal saw adapter of FIG. 6;

FIG. 9 is a cross-sectional view taken generally along the line 9—9 of FIG. 6;

FIG. 10 is a front, perspective view of a universal saw adapter, in accordance with a third embodiment of the invention, with a saw attached;

FIG. 11 is a rear perspective view of the universal saw adapter of FIG. 10;

FIG. 12 is a cross-sectional view taken generally along the line 12—12 of FIG. 10; and FIG. 13 is a cross-sectional view taken generally along the line 13—13 of FIG. 10.

DETAILED DESCRIPTION OF THE PREFERRED EMBODIMENTS

Figure 1:
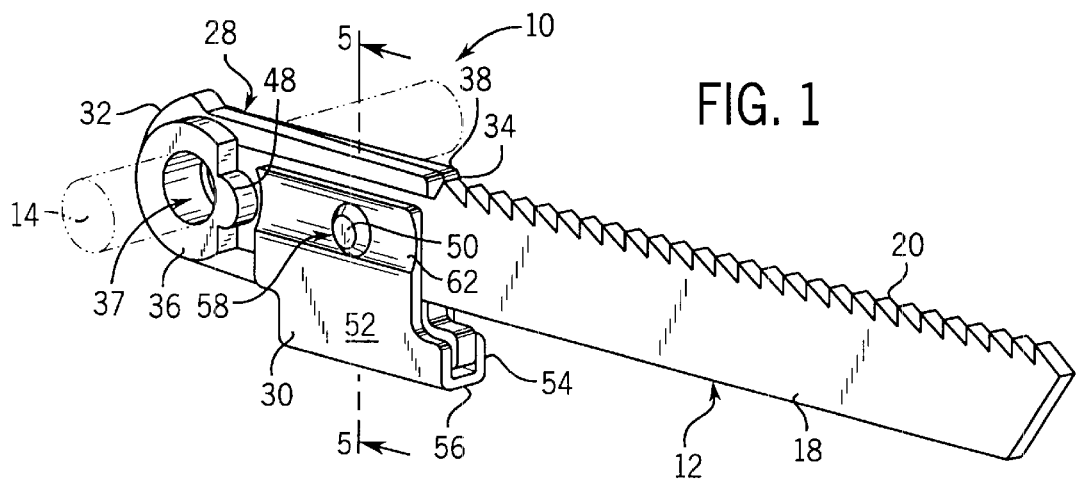
FIG. 1 is a front, perspective view of a universal saw adapter, according to a first embodiment of the present invention, including a clip shown in a closed position with a saw attached.

Referring generally to FIGS. 1–5, an exemplary saw adapter 10 in accordance with a first embodiment of the invention is provided. The saw adapter 10 is designed to couple a saw 12 to an axle 14 of a tool (not shown), such as a multifunction tool having a plurality of instruments. Two such multi-function tools are described in co-pending U.S. patent application Ser. No. 08/771,449, filed on Dec. 20, 1996 and entitled "Pocket Tool With Removable Jaws," and co-pending U.S. patent application Ser. No. 08/889,241, filed on Jul. 8, 1997 and entitled "Multi-Function Tool With Removable Head" (both herein incorporated by reference). The saw 12 may be a 0.25 inch universal jig or sabre saw. The saw 12 includes a tang portion 16 and a working portion 18, including a blade 20. The tang portion 16 has a notch 22, which is located along a free end 24, and an aperture 26 formed therein a spaced distance from the notch 22.

The saw adapter 10 includes a base member 28 and a clip 30 pivotally coupled to the base member 28. The base member 28 is preferably made of a durable corrosion resistant material, such as stainless steel, and may be formed by casting or other manufacturing methods. The base member 28 has a first end 32 and a second end 34, opposite the first end 32. Oppositely disposed first and second surfaces 36 and 38, respectively, extend between the first end 32 and the second end 34. The base member 28 has an opening 37 located proximate the first end 32. The opening 37 extends through the first and second surfaces 36 and 38 and is coupled to the axle 14 of the tool. The opening 37 preferably accommodates a 0.188 inch diameter axle for coupling the adapter 10 to the tool. However, the size of the opening 37 may be larger or smaller depending on the diameter of the axle 14 of the tool.

The first surface 36 of the base member 28 has a slot 40. The slot 40 is bounded by a back edge 42, a top edge 44, a bottom edge 46 and the second end 34 of the base member 28. The back edge 42 of the slot 40 is located proximate the opening 37. The slot 40 receives the tang portion 16 of the saw 12, when the saw is coupled to the adapter 10, with the working portion 18 of the saw 12 extending from the second end 34 of the adapter 10.

Jutting outwardly from the slot 40 are a first projection 48 and a second projection 50. The first projection 48 is located along the back edge 42 of the slot 40 and engages the notch 22 in the tang portion 16 of the saw 12. In the preferred embodiment of the invention, the first projection 48 is semi-cylindrical in configuration, however, the first projection may take on any other configuration, such as that of a triangle, rectangle or other appropriate shape, provided that the first projection corresponds to the notch 22 in the free end 24 of the saw 12. The second projection 50 is disposed a spaced distance from the first projection 48. The second projection 50 preferably has a cylindrical shape, like a post, and engages the aperture 26 in the tang portion 16 of the saw 12. Thus, the first and second projections 48 and 50, respectively, cooperate with the saw 12 to maintain the saw 12 in alignment with the adapter 10.

Figure 5:
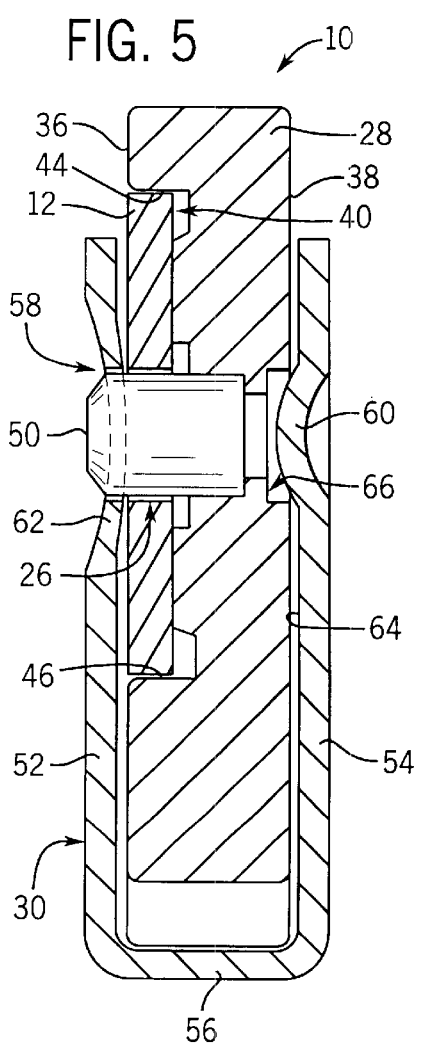
FIG. 5 is a cross-sectional view taken generally along the line 5—5 of FIG. 1.
Figure 4:
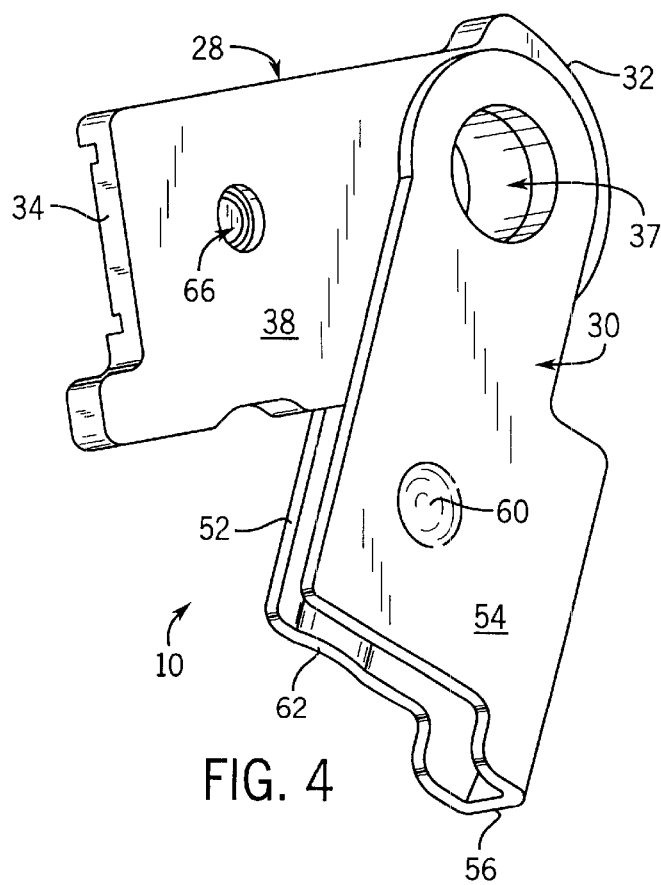
FIG. 4 is a rear, perspective view of the universal saw adapter of FIG. 3.
Figure 2:
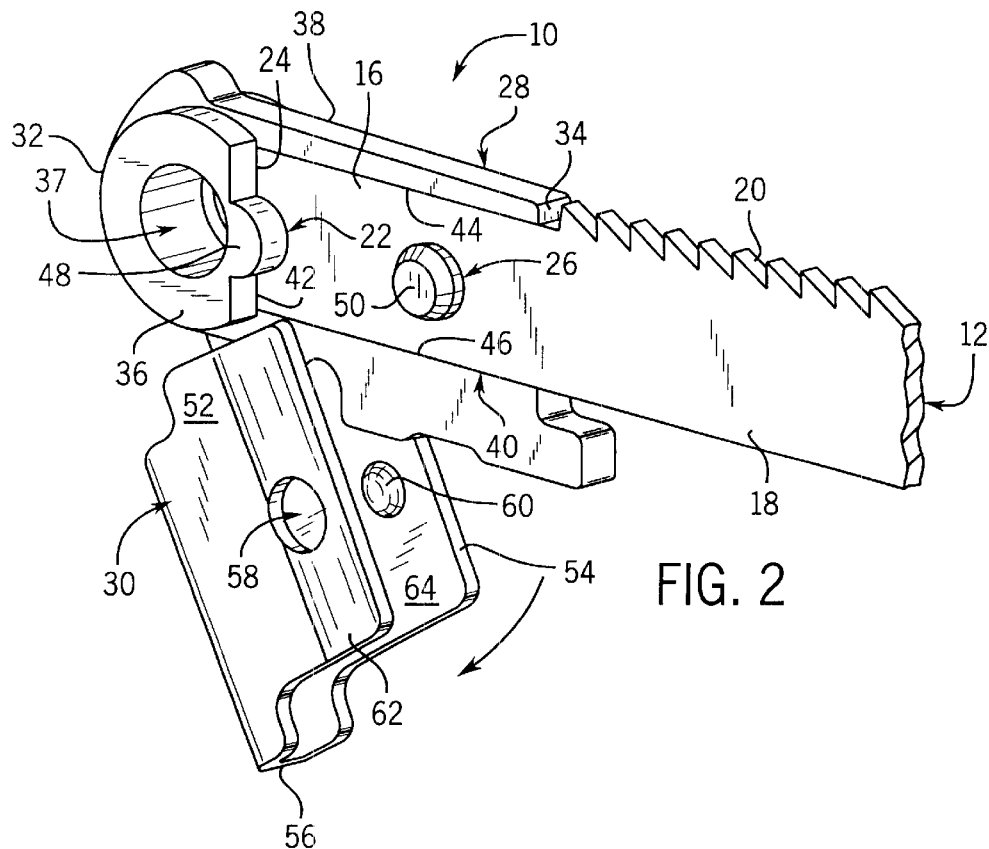
FIG. 2 is an enlarged, perspective view of the universal saw adapter of FIG. 1 with the clip shown in an open position.
Figure 3:
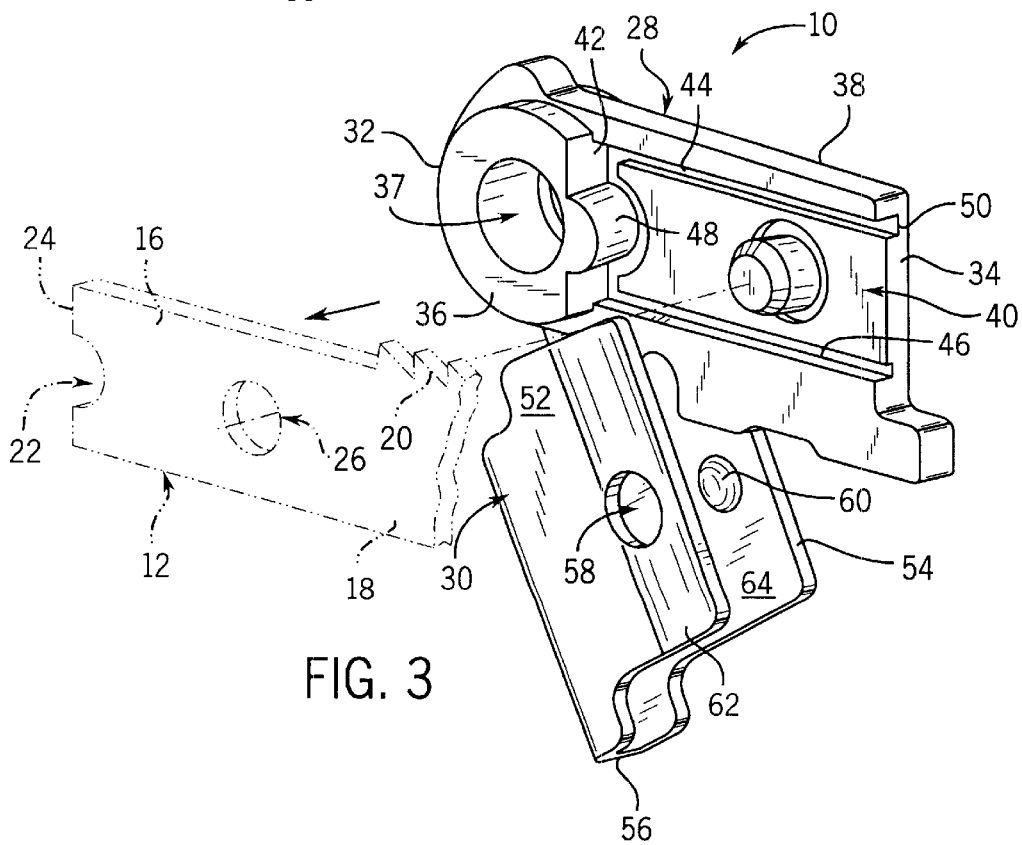
FIG. 3 is a perspective view of the universal saw adapter with the saw removed.

The saw 12 is secured in the slot 40 of the base member 28 by the clip 30. The clip 30 is pivotally coupled to the base member 28 and is movable between an open position (FIGS. 2–4) and a closed position (FIGS. 1 and 5). In the open position, the saw 12 may be removed from the adapter 10 by lifting the tang portion 16 of the saw 12 over and away from the first and second projections 48 and 50, respectively. In the closed position, the clip 30 locks the saw 12 in the base member 28.

As shown in the FIGS. 1–5, the clip 30 is generally U-shaped and has first and second walls 52 and 54, respectively, and a base portion 56 extending therebetween. When the clip 30 is in the closed position, the first wall 52 is adjacent the first surface 36 of the base member 28, and the second wall 54 is adjacent the second surface 38. The clip 30 has a means for locking the clip 30 to the base member 28. The locking means includes an opening 58 formed in the first wall 52. The opening 58 receives the second projection 50 of the base member 28 to lock the clip 30 to the base member 28, thereby preventing removal of the saw 12 from the adapter 10. The first wall 52 also includes a concave, curved portion 62 which biases the saw 12 firmly in the slot 40 of the base member 28, thereby preventing lateral movement of the saw 12.

In addition to the locking means provided by the opening 58 in the first wall 52 of the clip 30, as illustrated in FIGS. 2–5, the second wall 54 has a detent boss 60 to further secure the clip 30 to the base member 28. The detent boss 60, which is formed on an inner surface 64 of the second wall 54, cooperates with a detent hole 66, disposed in the second surface 38 of the base member 28. Thus, both the clip 30 is secured to the base member 28 at both the first and second walls 52 and 54, respectively.

The adapter 10, therefore, operates as follows. To couple a saw 12 to a tool having the adapter 10, the clip 30 is first rotated to the open position, exposing the slot 40 of the base member 28. The tang portion 16 of the saw 12 is inserted into the slot 40 such that the notch 22 and the aperture 26 of the saw 12 engage the first and second projections 48 and 50, respectively, of the base member 28. The clip 30 is then rotated back toward the base member until it is in the closed position. In the closed position, the engagements of opening 58 of the clip 30 with the second projection 50 of the base member 28 and the detent boss 60 with the detent hole 66 prevent the clip 30 from accidentally rotating with respect to the base member 28 and exposing the tang portion 16 of the saw 12. To remove the saw 12 from the tool, the first wall 52 of the clip 30 is pulled away from the first surface 36 of the base member 28, thereby disengaging the second projection 50 from the opening 58 and allowing the clip 30 to be rotated away from the base member 28. As the clip 30 is rotated away, the detent boss 60 of the clip 30 withdraws from the detent hole 66 in the second surface 38 of the base member 28. With the clip 30 rotated away from the base member 28 and the slot 40 exposed, the saw 12 may be removed from the base member 28.

Referring now to FIGS. 6–9, a second embodiment of an adapter 70 is shown. The adapter 70 includes a base member 72 having generally similar features as the base member 28 of the adapter 10. The base member 72 includes first and second ends 72 and 76, respectively, first and second surfaces 78 and 80, respectively, which extend between the first and second ends, and an opening 79 for receiving an axle (not shown) of a tool. A slot 82, formed in the first surface 78 of the base member 72, receives the tang portion 16 of the saw 12. The slot 82 is bounded by a back edge 82, top and bottom edges 86 and 88, respectively, and the second end 76. The base member 72 further includes a projection 89 which extends into the slot 82. The projection 89 is similar to the first projection 48 of the adapter 10 and engages the notch 22 of the saw 12.

In addition, the base member 72 of the adapter 70 has a plurality of bosses 90 which extend from the first surface 78 and into the slot 82. The bosses 90 are undercut such that the tang portion 16 of the saw 12 may be slid into the slot 82 through the second end 76. The bosses 90 prevent lateral movement of the tang portion 16 when the saw 12 is coupled to the adapter 70. In this preferred embodiment of the invention, two undercut bosses 90 extend downward from the top edge 86 of the slot 82, and two undercut bosses 90 extend upward from the bottom edge 88. While this preferred embodiment shows four undercut bosses 90, as few as two, or more than four, bosses may be provided. Moreover, the configuration of the bosses 90 may also be altered. For example, each boss 90 may have a rectangular configuration, rather than an arcuate one.

To secure the saw 12 to the adapter 70, the adapter 70 includes a fastener 92, such as a set screw. The fastener 92 is removably received in an opening 94 of the base member 72. The opening 94, which is formed in the second surface 76 and extends through to the slot 82, corresponds to the aperture 26 of the tang portion 16 saw 12. Thus, when the saw 12 is coupled to the adapter 70, the fastener 92 secures the saw 12 in place, thereby preventing the saw 12 from being removed through the second end 76 of the base member 72.

A third embodiment of an adapter 100 is illustrated in FIGS. 10–13. The adapter 100 includes a base member 72, identical to that of the adapter 70. In lieu of the fastener 92 of the adapter 80, however, the adapter 100 includes a retaining clip 102 which is coupled to the second surface 80 of the base member 72. The retaining clip 102 is attached to the base member 72 at the first end 72 and includes an opening 104, which corresponds to the opening 79 for receiving the axle of the tool. The retaining clip 102 may be coupled to the base member 72 in a conventional manner, such as by welding, rivets or other mechanical fasteners.

The retaining clip 102 includes a tab 106 which projects into the opening 94 of the base member 72 to secure the saw 12 to the adapter 100. The retaining clip 102 is spring loaded such that the tab 106, extending through the opening 94, is biased into engagement with the aperture 26 of the saw 12 to prevent the saw 12 from being removed from the second end 76. In order to insert or remove the saw 12 from the adapter 100, the free end of the retaining clip 102 must be pulled away from the second surface 80 of the base member 72, as shown in phantom lines in FIGS. 12 and 13, to withdraw the tab 106 from the slot 82, thereby enabling the saw 12 to move longitudinally along the slot 82. The saw 12 may then be inserted or removed from the slot 82 through the second end 76. During insertion, the free end 24 of the saw 12 is introduced into the slot 82 until it engages the back edge 84 thereof. When the free end of the retaining clip 102 is released, the tab 104 returns to its normal position in the opening 94 and engages the aperture 26 of the saw 12.

It will be understood that the foregoing description is of the preferred embodiments of this invention and that the invention is not limited to the specific forms shown or described. Modifications may be made in the design and arrangement of the elements without departing from the scope of the invention as expressed in the appended claims.

What is claimed is:

1. A tool having an adapter for removably coupling a saw to the tool, comprising: a saw including a tang portion having an aperture formed therein, the adapter including:

a base member having first and second ends, first and second surfaces extending between the first and second ends, an opening formed in the first and second surfaces proximate the first end, a slot formed in the first surface receiving the tang portion of the saw, and a projection extending into the slot engaging the aperture of the saw to align the saw with the base member; and a clip pivotally coupled to the base member, the clip having an opening coaxial with the opening of the base member, the two openings receiving an axle of the tool, the clip movable between a closed position in which the saw is retained in and secured to the base member and an open position in which the saw is removable from the base member.

2. The tool of claim 1, wherein the clip has a second opening formed therein, the second opening receiving the projection when the clip is in the closed position.

3. The tool of claim 1, wherein the base member includes one of a detent boss and a detent hole, and the clip includes the other of the detent boss and the detent hole, the detent boss and the detent hole cooperating to retain the clip in the closed position.

4. The tool of claim 3, wherein the detent boss is on the clip and the detent hole is formed in the second surface of the base member.

5. A tool having an adapter for removably coupling a saw to the tool, the saw including a tang portion having a notch and an aperture formed therein, the adapter comprising:

a base member having first and second ends, first and second surfaces extending between the first and second ends, an opening formed in the first and second surfaces proximate the first end, the opening receiving an axle of the tool, a slot formed in the first surface, the slot extending from proximate the opening to the second end receiving the tang portion of the saw, and first and second projections extending into the slot, the first projection engaging the notch of the saw, the second projection received in the aperture of the saw to align the saw with the adapter; and a clip pivotally coupled to the base member, the clip movable between a closed position in which the saw is retained in and secured to the base member and an open position in which the saw is removable from the base member, the clip including means for locking the clip in the closed position.

6. The tool of claim 5, wherein the locking means includes an opening formed in the clip, the opening receiving the second projection when the adapter is in the closed position.

7. The tool of claim 6, wherein the locking means further includes one of a detent boss and a detent hole formed in the clip, the one of the detent boss and the detent hole cooperating with the other of the detent boss and the detent hole located on the base member when the clip is in the closed position.

8. The tool of claim 7, wherein the detent boss is on the clip and the detent hole is formed in the second surface of the base member.

9. A saw attachment mechanism for a tool, comprising:

a tool;

a base member pivotally attached to the tool by an axle extending through an opening of the base member, the base member having a slot and a projection extending into the slot;

a clip pivotally coupled to the base member, the clip having an opening coaxial with the opening of the base member, the two openings receiving the axle of the tool; and a saw having a tang received in the slot and removably held in position by the clip, the saw having an aperture disposed over the projection to align the saw.

10. The saw attachment mechanism of claim 9, wherein the clip has a second opening formed therein, the second opening receiving the projection when the clip is in the closed position.

11. The saw attachment mechanism of claim 9, wherein the base member includes one of a detent boss and a detent hole, and the clip includes the other of the detent boss and the detent hole, the detent boss and the detent hole cooperating to retain the clip in the closed position.

12. The saw attachment mechanism of claim 11, wherein the detent boss is on the clip and the detent hole is formed in the base member.

* * * * *